US009744856B2

(12) United States Patent
Nagashita

(10) Patent No.: US 9,744,856 B2
(45) Date of Patent: Aug. 29, 2017

(54) POWER CONVERSION APPARATUS

(71) Applicant: Toyota Jidosha Kabushiki Kaisha, Toyota-shi, Aichi-ken (JP)

(72) Inventor: Kenichiro Nagashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 379 days.

(21) Appl. No.: 14/677,362

(22) Filed: Apr. 2, 2015

(65) Prior Publication Data

US 2015/0291035 A1    Oct. 15, 2015

(30) Foreign Application Priority Data

Apr. 9, 2014  (JP) ................................. 2014-080487

(51) Int. Cl.
| | | |
|---|---|---|
| *H02J 1/10* | (2006.01) | |
| *B60L 1/00* | (2006.01) | |
| *B60L 11/18* | (2006.01) | |
| *H02M 1/10* | (2006.01) | |
| *H02M 3/335* | (2006.01) | |
| *H02M 3/337* | (2006.01) | |
| *H02M 1/00* | (2006.01) | |

(52) U.S. Cl.
CPC ............. *B60L 1/00* (2013.01); *B60L 11/1812* (2013.01); *H02M 1/10* (2013.01); *H02M 3/3378* (2013.01); *H02M 3/33584* (2013.01); *H02M 2001/0003* (2013.01); *Y02T 10/7005* (2013.01); *Y02T 10/7216* (2013.01); *Y02T 10/7241* (2013.01); *Y02T 90/127* (2013.01); *Y02T 90/14* (2013.01)

(58) Field of Classification Search
None
See application file for complete search history.

(56) References Cited

U.S. PATENT DOCUMENTS

| | | | | |
|---|---|---|---|---|
| 9,203,322 | B2 * | 12/2015 | Muto | ................ H02M 3/33592 |
| 9,276,484 | B2 * | 3/2016 | Muto | ................ H02M 3/33561 |
| 2011/0198933 | A1 | 8/2011 | Ishigaki et al. | |

FOREIGN PATENT DOCUMENTS

| | | |
|---|---|---|
| JP | 2011-193713 A | 9/2011 |
| JP | 2012-125040 A | 6/2012 |
| JP | 2013-150524 A | 8/2013 |

* cited by examiner

*Primary Examiner* — Long Nguyen
(74) *Attorney, Agent, or Firm* — Dinsmore & Shohl LLP

(57) ABSTRACT

A power conversion apparatus is configured to supply a power to an auxiliary device provided in a vehicle, and the power conversion apparatus includes: a primary side circuit including a primary side port; a secondary side circuit including a plurality of secondary side ports and magnetically coupled with the primary side circuit via a transformer; a control unit configured to control a transmitted power that is transmitted between the primary side circuit and the secondary side circuit by changing a phase difference between a switching of the primary side circuit and a switching of the secondary side circuit; an inverter connected to a first secondary side port and supplying the power to the auxiliary device via the primary side port; and a charger connected to a second secondary side port and supplying the power to the auxiliary device via the primary side port.

6 Claims, 9 Drawing Sheets

POWER CONVERSION APPARATUS

INCORPORATION BY REFERENCE

The disclosure of Japanese Patent Application No. 2014-080487 filed on Apr. 9, 2014 including the specification, drawings and abstract is incorporated herein by reference in its entirety.

BACKGROUND OF THE INVENTION

1. Field of the Invention

The present invention relates to a power conversion apparatus.

2. Description of Related Art

There has been known a power conversion apparatus that is configured to adjust, according to a phase difference $\phi$, a transmitted power that is transmitted between a primary side conversion circuit including a plurality of primary side ports and a secondary side conversion circuit including a plurality of secondary side ports and magnetically coupled with the primary side conversion circuit via a transformer (see Japanese Patent Application Publication No. 2011-193713 (JP 2011-193713 A), for example).

Further, there has been known a PHV (a plug-in hybrid car) which includes a DCDC converter connected to an inverter, and a DCDC converter provided in an AC input charger, and which is configured to supply a power to an auxiliary device as appropriate.

However, as the number of DCDC converters connected to a power supply increases, it costs more.

SUMMARY OF THE INVENTION

In view of this, one aspect of the present invention provides a low-cost power conversion apparatus.

One aspect of the present invention provides a power conversion apparatus configured to supply a power to an auxiliary device provided in a vehicle, which power conversion apparatus includes: a primary side circuit including a primary side port; a secondary side circuit including a plurality of secondary side ports and magnetically coupled with the primary side circuit via a transformer; a control unit configured to control a transmitted power that is transmitted between the primary side circuit and the secondary side circuit by changing a phase difference between a switching of the primary side circuit and a switching of the secondary side circuit; an inverter connected to a first secondary side port and supplying the power to the auxiliary device via the primary side port; and a charger connected to a second secondary side port and supplying the power to the auxiliary device via the primary side port.

According to the one embodiment, it is possible to provide a low-cost power conversion apparatus.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<Configuration of Power Supply Device 101>

Figure 1:
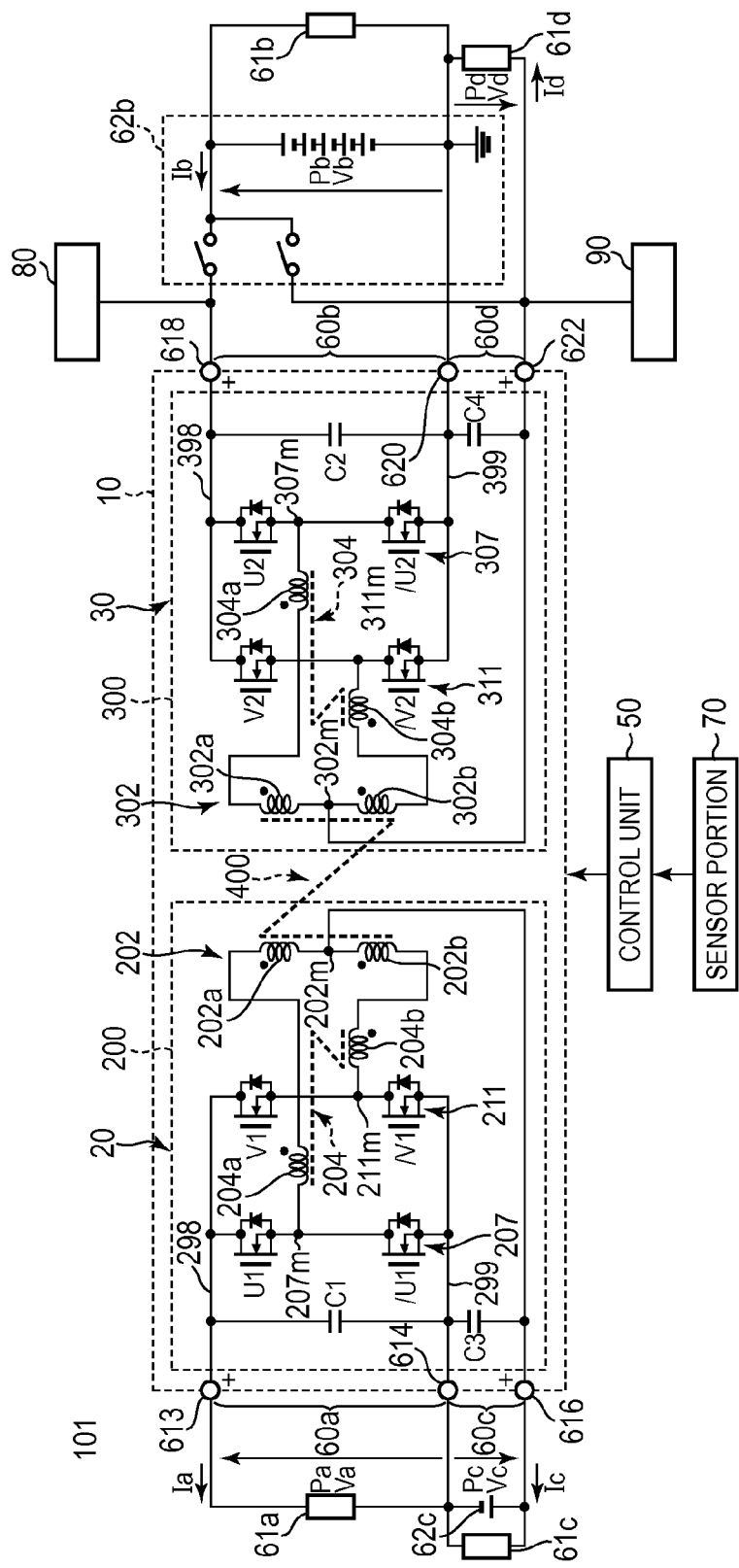
FIG. 1 is a block diagram illustrating an exemplary configuration of a power supply device according to one embodiment of a power conversion apparatus.

FIG. 1 is a block diagram illustrating an exemplary configuration of a power supply device 101 according to an embodiment of a power conversion apparatus. The power supply device 101 is a power supply system including a power supply circuit 10, a control unit 50, and a sensor portion 70. The power supply device 101 is a system which is provided in a vehicle such as an automobile and which supplies electricity to each load in the vehicle. Concrete examples of such a vehicle include a hybrid vehicle, a plug-in hybrid vehicle, an electric vehicle, and the like.

The power supply device 101 includes, as primary side ports, a first input-output port 60a to which a primary side high-voltage load (e.g., an electric power steering system (EPS), or the like) 61a is connected, and a second input-output port 60c to which a primary side low-voltage load (e.g., an electric control unit (ECU), an electric control brake system (ECB), and the like) 61c and a primary side low-voltage power supply (e.g., an auxiliary battery) 62c are connected, for example. The primary side low-voltage power supply 62c supplies a power to the primary side low-voltage load 61c that works at the same voltage system (for example, 12-V system) as the primary side low-voltage power supply 62c. Further, the primary side low-voltage power supply 62c supplies a power stepped up by a primary side conversion circuit 20 provided in the power supply circuit 10, to the primary side high-voltage load 61a that works at a voltage system (for example, 48-V system higher than the 12-V system) different from the primary side low-voltage power supply 62c. A concrete example of the primary side low-voltage power supply 62c includes a secondary battery such as a lead battery.

The power supply device 101 includes, as secondary side ports, a third input-output port 60b to which an inverter 80, a secondary side high-voltage load 61b, and a secondary side high-voltage power supply 62b (e.g., a main battery, a battery back, and so on) are connected, and a fourth input-output port 60d to which a charger 90 and a secondary side low-voltage load 61d are connected, for example. The secondary side high-voltage power supply 62b supplies a power to the secondary side high-voltage load 61b that works at the same voltage system (for example, 288-V system higher than the 12-V system and the 48-V system) as the secondary side high-voltage power supply 62b. Further, the secondary side high-voltage power supply 62b supplies a power stepped down by a secondary side conversion circuit 30 provided in the power supply circuit 10, to the secondary side low-voltage load 61d that works at a voltage system (for example, 72-V system lower than the 288-V system) different from the secondary side high-voltage power supply 62b. A concrete example of the secondary side high-voltage power supply 62b includes a secondary battery such as a lithium ion battery.

The power supply circuit 10 is a power conversion circuit which has four input-output ports as described above and which has a function to perform power conversion between any two input-output ports selected from among the four input-output ports. Note that the power supply device 101 including the power supply circuit 10 may be a device which has at least three or more input-output ports and which can convert a power between any two input-output ports selected from among the at least three or more input-output ports. For example, the power supply circuit 10 may be a circuit having three input-output ports without the fourth input-output port 60d.

Port powers Pa, Pc, Pb, Pd are input/output powers (an input power or an output power) of the first input-output port 60a, the second input-output port 60c, the third input-output port 60b, and the fourth input-output port 60d, respectively. Port voltages Va, Vc, Vb, Vd are input/output voltages (an input voltage or an output voltage) of the first input-output port 60a, the second input-output port 60c, the third input-output port 60b, and the fourth input-output port 60d, respectively. Port currents Ia, Ic, Ib, Id are input/output currents (an input current or an output current) of the first input-output port 60a, the second input-output port 60c, the third input-output port 60b, and the fourth input-output port 60d, respectively.

The power supply circuit 10 includes a capacitor C1 provided in the first input-output port 60a, capacitor C3 provided in the second input-output port 60c, a capacitor C2 provided in the third input-output port 60b, and a capacitor C4 provided in the fourth input-output port 60d. Concrete examples of the capacitors C1, C2, C3, C4 include a film capacitor, an aluminum electrolytic capacitor, a ceramic capacitor, a solid polymer capacitor, and the like.

The capacitor C1 is inserted between a high-voltage-side terminal 613 of the first input-output port 60a and a low-voltage-side terminal 614 of the first input-output port 60a and the second input-output port 60c. The capacitor C3 is inserted between a high-voltage-side terminal 616 of the second input-output port 60c and the low-voltage-side terminal 614 of the first input-output port 60a and the second input-output port 60c. The capacitor C2 is inserted between a high-voltage-side terminal 618 of the third input-output port 60b and a low-voltage-side terminal 620 of the third input-output port 60b and the fourth input-output port 60d. The capacitor C4 is inserted between a high-voltage-side terminal 622 of the fourth input-output port 60d and the low-voltage-side terminal 620 of the third input-output port 60b and the fourth input-output port 60d.

The capacitors C1, C2, C3, C4 may be provided in the power supply circuit 10, or may be provided outside the power supply circuit 10.

The power supply circuit 10 is a power conversion circuit including the primary side conversion circuit 20 and the secondary side conversion circuit 30. Note that the primary side conversion circuit 20 and the secondary side conversion circuit 30 are connected to each other via a primary side magnetic coupling reactor 204 and a secondary side magnetic coupling reactor 304, and are magnetically coupled with each other via a transformer 400 (a center-tap transformer). The primary side ports constituted by the first input-output port 60a and the second input-output port 60c are connected to the secondary side ports constituted by the third input-output port 60b and the fourth input-output port 60d, via the transformer 400.

The primary side conversion circuit 20 is a primary side circuit including a primary side full bridge circuit 200, the first input-output port 60a, and the second input-output port 60c. The primary side full bridge circuit 200 is a primary side power converting portion including a primary side coil 202 of the transformer 400, the primary side magnetic coupling reactor 204, a primary side first upper arm U1, a primary side first lower arm /U1, a primary side second upper arm V1, and a primary side second lower arm /V1. Here, the primary side first upper arm U1, the primary side first lower arm U1, the primary side second upper arm V1, and the primary side second lower arm /V1 are each a switching element including an N-channel MOSFET, and a body diode, which is a parasitic element of the MOSFET, for example. A diode may be additionally connected to the MOSFET in parallel.

The primary side full bridge circuit 200 includes a primary side positive electrode bus 298 connected to the high-voltage-side terminal 613 of the first input-output port 60a, and a primary side negative electrode bus 299 connected to the low-voltage-side terminal 614 of the first input-output port 60a and the second input-output port 60c.

A primary side first arm circuit 207 that connects the primary side first upper arm U1 to the primary side first lower arm /U1 in series is attached between the primary side positive electrode bus 298 and the primary side negative electrode bus 299. The primary side first arm circuit 207 is a primary side first power conversion circuit portion (a primary side U-phase power conversion circuit portion) that can perform a power conversion operation according to ON-OFF switching operations of the primary side first upper arm U1 and the primary side first lower arm /U1. Further, a primary side second arm circuit 211 that connects the primary side second upper arm V1 to the primary side second lower arm /V1 in series is attached between the primary side positive electrode bus 298 and the primary side negative electrode bus 299 in parallel to the primary side first arm circuit 207. The primary side second arm circuit 211 is a primary side second power conversion circuit portion (a primary side V-phase power conversion circuit portion) that can perform a power conversion operation according to ON-OFF switching operations of the primary side second upper arm V1 and the primary side second lower arm /V1.

A bridge portion that connects a middle point 207m of the primary side first arm circuit 207 to a middle point 211m of the primary side second arm circuit 211 is provided with the primary side coil 202 and the primary side magnetic coupling reactor 204. A connection relationship in the bridge portion is described below more specifically. One end of a primary side first reactor 204a of the primary side magnetic coupling reactor 204 is connected to the middle point 207m of the primary side first arm circuit 207. Then, one end of the primary side coil 202 is connected to the other end of the primary side first reactor 204a. Further, one end of a primary side second reactor 204b of the primary side magnetic coupling reactor 204 is connected to the other end of the primary side coil 202. Furthermore, the other end of the primary side second reactor 204b is connected to the middle point 211m of the primary side second arm circuit 211. Note that the primary side magnetic coupling reactor 204 is constituted by the primary side first reactor 204a, and the primary side second reactor 204b magnetically coupled with the primary side first reactor 204a with a coupling factor k1.

The middle point 207m is a primary side first middle node between the primary side first upper arm U1 and the primary side first lower arm /U1, and the middle point 211m is a primary side second middle node between the primary side second upper arm V1 and the primary side second lower arm /V1.

The first input-output port 60a is a port provided between the primary side positive electrode bus 298 and the primary side negative electrode bus 299. The first input-output port 60a includes the terminal 613 and the terminal 614. The second input-output port 60c is a port provided between the primary side negative electrode bus 299 and a center tap 202m of the primary side coil 202. The second input-output port 60c includes the terminal 614 and the terminal 616.

The port voltage Va of the first input-output port 60a and the port voltage Vc of the second input-output port 60c vary depending on a voltage of the primary side low-voltage power supply 62c.

The center tap 202m is connected to the high-voltage-side terminal 616 of the second input-output port 60c. The center tap 202m is a middle connecting point between a primary side first winding 202a and a primary side second winding 202b provided in the primary side coil 202.

The secondary side conversion circuit 30 is a secondary side circuit including a secondary side full bridge circuit 300, the third input-output port 60b, and the fourth input-output port 60d. The secondary side full bridge circuit 300 is a secondary side power converting portion including a secondary side coil 302 of the transformer 400, the secondary side magnetic coupling reactor 304, a secondary side first upper arm U2, a secondary side first lower arm /U2, a secondary side second upper arm V2, and a secondary side second lower arm /V2. Here, the secondary side first upper arm U2, the secondary side first lower arm /U2, the secondary side second upper arm V2, and the secondary side second lower arm /V2 are each a switching element including an N-channel MOSFET, and a body diode, which is a parasitic element of the MOSFET, for example. A diode may be additionally connected to the MOSFET in parallel.

The secondary side full bridge circuit 300 includes a secondary side positive electrode bus 398 connected to the high-voltage-side terminal 618 of the third input-output port 60b, and a secondary side negative electrode bus 399 connected to the low-voltage-side terminal 620 of the third input-output port 60b and the fourth input-output port 60d.

A secondary side first arm circuit 307 that connects the secondary side first upper arm U2 to the secondary side first lower arm /U2 in series is attached between the secondary side positive electrode bus 398 and the secondary side negative electrode bus 399. The secondary side first arm circuit 307 is a secondary side first power conversion circuit portion (a secondary side U-phase power conversion circuit portion) that can perform a power conversion operation according to ON-OFF switching operations of the secondary side first upper arm U2 and the secondary side first lower arm /U2. Further, a secondary side second arm circuit 311 that connects the secondary side second upper arm V2 to the secondary side second lower arm /V2 in series is attached between the secondary side positive electrode bus 398 and the secondary side negative electrode bus 399 in parallel to the secondary side first arm circuit 307. The secondary side second arm circuit 311 is a secondary side second power conversion circuit portion (a secondary side V-phase power conversion circuit portion) that can perform a power conversion operation according to ON-OFF switching operations of the secondary side second upper arm V2 and the secondary side second lower arm /V2.

A bridge portion that connects a middle point 307m of the secondary side first arm circuit 307 to a middle point 311m of the secondary side second arm circuit 311 is provided with the secondary side coil 302 and the secondary side magnetic coupling reactor 304. A connection relationship in the bridge portion is described below more specifically. One end of a secondary side first reactor 304a of the secondary side magnetic coupling reactor 304 is connected to the middle point 307m of the secondary side first arm circuit 307. Then, one end of the secondary side coil 302 is connected to the other end of the secondary side first reactor 304a. Further, one end of a secondary side second reactor 304b of the secondary side magnetic coupling reactor 304 is connected to the other end of the secondary side coil 302. Furthermore, the other end of the secondary side second reactor 304b is connected to the middle point 311m of the secondary side second arm circuit 311. Note that the secondary side magnetic coupling reactor 304 is constituted by the secondary side first reactor 304a, and the secondary side second reactor 304b magnetically coupled with the secondary side first reactor 304a with a coupling factor k1.

The middle point 307m is a secondary side first middle node between the secondary side first upper arm U2 and the secondary side first lower arm /U2, and the middle point 311m is a secondary side second middle node between the secondary side second upper arm V2 and the secondary side second lower arm /V2.

The third input-output port 60b is a port provided between the secondary side positive electrode bus 398 and the secondary side negative electrode bus 399. The third input-output port 60b includes the terminal 618 and the terminal 620. The fourth input-output port 60d is a port provided between the secondary side negative electrode bus 399 and a center tap 302m of the secondary side coil 302. The fourth input-output port 60d includes the terminal 620 and the terminal 622.

The port voltage Vb of the third input-output port 60b and the port voltage Vd of the fourth input-output port 60d vary depending on a voltage of the secondary side high-voltage power supply 62b.

The center tap 302m is connected to the high-voltage-side terminal 622 of the fourth input-output port 60d. The center tap 302m is a middle connecting point between a secondary side first winding 302a and a secondary side second winding 302b provided in the secondary side coil 302.

In FIG. 1, the power supply device 101 includes the sensor portion 70. The sensor portion 70 is detecting means configured to detect an input-output value Y of at least one of the first to fourth input-output ports 60a, 60c, 60b, 60d at a predetermined detection period, and to output a detection value Yd corresponding to the input-output value Y thus detected, to the control unit 50. The detection value Yd may be a detected voltage obtained by detecting an input-output voltage, a detected current obtained by detecting an input-output current, or a detected power obtained by detecting an input-output power. The sensor portion 70 may be provided inside the power supply circuit 10, or outside the power supply circuit 10.

The sensor portion 70 includes, for example, a voltage detecting portion configured to detect an input-output voltage caused in at least one of the first to fourth input-output ports 60a, 60c, 60b, 60d. The sensor portion 70 includes, for example, a primary side voltage detecting portion configured to output at least one detected voltage out of an input-output voltage Va and an input-output voltage Vc as a primary side voltage detection value, and a secondary side voltage detecting portion configured to output at least one detected voltage out of an input-output voltage Vb and an input-output voltage Vd as a secondary side voltage detection value.

The voltage detecting portion of the sensor portion 70 includes, for example, a voltage sensor configured to monitor an input-output voltage value of at least one of the ports, and a voltage detecting circuit configured to output, to the control unit 50, a detected voltage corresponding to the input-output voltage value thus monitored by the voltage sensor.

The sensor portion 70 includes, for example, a current detecting portion configured to detect an input-output current flowing through at least one of the first to fourth input-output ports 60a, 60c, 60b, 60d. The sensor portion 70 includes, for example, a primary side current detecting portion configured to output at least one detected current out of an input-output current Ia and an input-output current Ic as a primary side current detection value, and a secondary side current detecting portion configured to output at least one detected current out of an input-output current Ib and an input-output current Id as a secondary side current detection value.

The current detecting portion of the sensor portion 70 includes, for example, a current sensor configured to monitor an input-output current value of at least one of the ports, and a current detecting circuit configured to output, to the control unit 50, a detected current corresponding to the input-output current value thus monitored by the current sensor.

The power supply device 101 includes the control unit 50. The control unit 50 is an electronic circuit including a microcomputer provided with a CPU, for example. The control unit 50 may be provided inside the power supply circuit 10, or outside the power supply circuit 10.

The control unit 50 changes a value of a predetermined control parameter X, so as to perform a feedback control on a power conversion operation performed in the power supply circuit 10, so that the control unit 50 can adjust an input-output value Y in each of the first to fourth input-output ports 60a, 60c, 60b, 60d of the power supply circuit 10. Examples of the control parameter X mainly include two types of control variables, i.e., a phase difference $\phi$ and a duty ratio D (ON time $\delta$).

The phase difference $\phi$ indicates a difference (time-lag) in switching timing between power conversion circuit portions of the same phase in the primary side full bridge circuit 200 and the secondary side full bridge circuit 300. The duty ratio D (ON time $\delta$) indicates a duty ratio (ON time) of a switching waveform in each of the power conversion circuit portions provided in the primary side full bridge circuit 200 and in the secondary side full bridge circuit 300.

These two control parameters X can be controlled independently. The control unit 50 changes the input-output value Y in each of the input-output ports of the power supply circuit 10 by performing a duty ratio control and/or a phase control on the primary side full bridge circuit 200 and the secondary side full bridge circuit 300 by use of the phase difference $\phi$ and the duty ratio D (ON time $\delta$).

The control unit 50 performs a feedback control on a power conversion operation by the power supply circuit 10 so that the phase difference $\phi$ or the duty ratio D changes into a value at which a detection value Yd of an input-output value Y in at least one of the first to fourth input-output ports 60a, 60c, 60b, 60d is converged to a target value Yo set in the at least one of the ports. The target value Yo is an instruction value to be set by the control unit 50 or a predetermined device except the control unit 50 based on a drive condition prescribed for each load (e.g., the primary side low-voltage load 61c) connected to each of the input-output ports. The target value Yo functions as an output target value when a power is output from a port, and functions as an input target value when a power is input into a port. The target value Yo may be a target voltage value, a target current value, or a target power value.

Further, the control unit 50 performs a feedback control on a power conversion operation by the power supply circuit 10 so that the phase difference $\phi$ changes into a value at which a transmitted power P that is transmitted between the primary side conversion circuit 20 and the secondary side conversion circuit 30 via the transformer 400 is converted to a set target transmitted power. The transmitted power is called a power transmission amount. The target transmitted power is an instruction value to be set by the control unit 50 or a predetermined device except the control unit 50 based on a deviation between a detection value Yd of any of the ports and the target value Yo.

In FIG. 1, the power supply device 101 includes the inverter 80 and the charger 90.

The inverter 80 is connected to the third input-output port 60b, for example, and supplies a power to the auxiliary device via the power supply circuit 10 and the second input-output port 60c. Since the power supply device 101 includes the inverter 80, even if the secondary side high-voltage power supply 62b cannot be used (due to breakdown or the like, for example), the power supply device 101 can supply a power to the auxiliary device.

The charger 90 is connected to the fourth input-output port 60d, for example, and supplies a power to the auxiliary device via the power supply circuit 10 and the second input-output port 60c. Since the power supply device 101 includes the charger 90, even if the secondary side high-voltage power supply 62b and the inverter 80 cannot be used, the power supply device 101 can supply a power to the auxiliary device.

Figure 2:
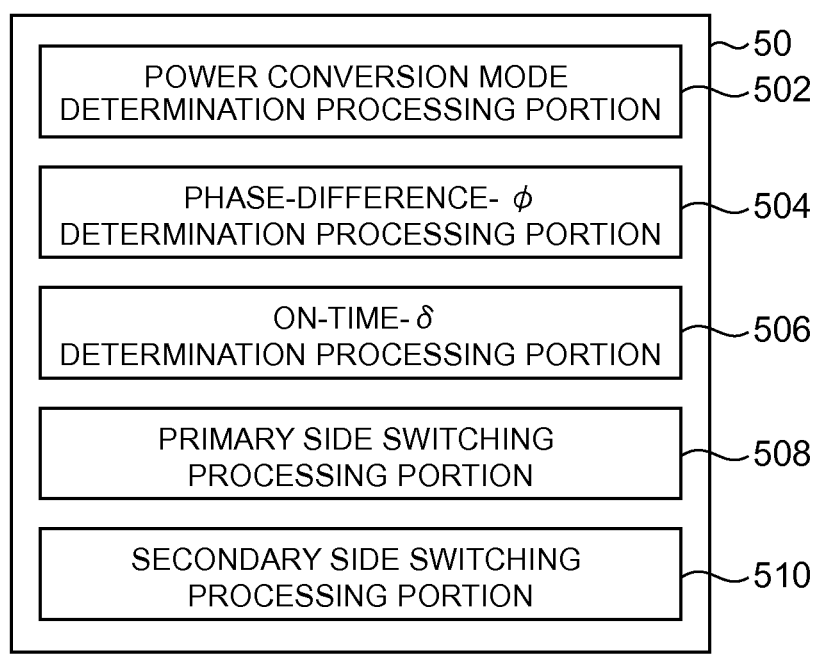
FIG. 2 is a block diagram illustrating an exemplary configuration of a control unit.

FIG. 2 is a block diagram of the control unit 50. The control unit 50 is a control unit having a function to perform a switching control of each switching element such as the primary side first upper arm U1 of the primary side conversion circuit 20 and each switching element such as the secondary side first upper arm U2 of the secondary side conversion circuit 30. The control unit 50 includes a power conversion mode determination processing portion 502, a phase-difference-$\phi$ determination processing portion 504, an ON-time-$\delta$ determination processing portion 506, a primary side switching processing portion 508, a secondary side switching processing portion 510, and the like. The control unit 50 is an electronic circuit including a microcomputer provided with a CPU, for example.

The power conversion mode determination processing portion 502 selects and determines an operation mode from power conversion modes A to L (described below) of the power supply circuit 10 based on a predetermined external signal (e.g., a signal indicative of a deviation between the detection value Yd and the target value Yo in any of the ports). Power conversion modes include: a mode A in which a power input from the first input-output port 60a is converted and output to the second input-output port 60c; a mode B in which a power input from the first input-output port 60a is converted and output to the third input-port 60b; and a mode C in which a power input from the first input-output port 60a is converted and output to the fourth input-output port 60d.

Further, the power conversion modes include: a mode D in which a power input from the second input-output port 60c is converted and output to the first input-output port 60a; a mode E in which a power input from the second input-output port 60c is converted and output to the third input-output port 60b; and a mode F in which a power input from the second input-output port 60c is converted and output to the fourth input-output port 60d.

Furthermore, the power conversion modes include: a mode G in which a power input from the third input-output port 60b is converted and output to the first input-output port 60a; a mode H in which a power input from the third input-output port 60b is converted and output to the second input-output port 60c; and a mode I in which a power input from the third input-output port 60b is converted and output to the fourth input-output port 60d.

Then, the power conversion modes include: a mode J in which a power input from the fourth input-output port 60d is converted and output to the first input-output port 60a; a mode K in which a power input from the fourth input-output port 60d is converted and output to the second input-output port 60c; and a mode L in which a power input from the fourth input-output port 60d is converted and output to the third input-output port 60b.

The phase-difference-$\phi$ determination processing portion 504 has a function to set a phase difference $\phi$ in switching periodic motion of the switching element between the primary side conversion circuit 20 and the secondary side conversion circuit 30, in order to functionalize the power supply circuit 10 as a DC-DC converter circuit.

The ON-time-$\delta$ determination processing portion 506 has a function to set ON times $\delta$ of the switching elements of the primary side conversion circuit 20 and the secondary side conversion circuit 30, in order to functionalize each of the primary side conversion circuit 20 and the secondary side conversion circuit 30 as a buck-boost circuit.

The primary side switching processing portion 508 has a function to perform a switching control on each of the switching elements, i.e., the primary side first upper arm U1, the primary side first lower arm /U1, the primary side second upper arm V1, and the primary side second lower arm /V1, based on outputs from the power conversion mode determination processing portion 502, the phase-difference-$\phi$ determination processing portion 504, and the ON-time-$\delta$ determination processing portion 506.

The secondary side switching processing portion 510 has a function to perform a switching control on each of the switching elements, i.e., the secondary side first upper arm U2, the secondary side first lower arm /U2, the secondary side second upper arm V2, and the secondary side second lower arm /V2, based on outputs from the power conversion mode determination processing portion 502, the phase-difference-$\phi$ determination processing portion 504, and the ON-time-$\delta$ determination processing portion 506.

The control unit 50 is not limited to the process illustrated in FIG. 2, and can perform various processes required to control a transmitted power to be transmitted between the primary side conversion circuit 20 and the secondary side conversion circuit 30.

<Operation of Power Supply Device 101>

An operation of the power supply device 101 is described with reference to FIGS. 1 and 2. For example, in a case where an external signal that requests to cause the power supply circuit 10 to operate in the mode F as the power conversion mode, the power conversion mode determination processing portion 502 of the control unit 50 determines the mode F as the power conversion mode of the power supply circuit 10. At this time, a voltage input into the second input-output port 60c is increased by a step-up function of the primary side conversion circuit 20, a power of the voltage thus increased is transmitted to the third input-output port 60b by the function of the power supply circuit 10 as the DC-DC converter circuit, and further, the voltage is decreased by a step-down function of the secondary side conversion circuit 30 and then output from the fourth input-output port 60d.

Here, the following describes the step-up and step-down functions of the primary side conversion circuit 20. In regard to the second input-output port 60c and the first input-output port 60a, the terminal 616 of the second input-output port 60c is connected to the middle point 207m of the primary side first arm circuit 207 via the primary side first winding 202a and the primary side first reactor 204a connected in series to the primary side first winding 202a. Since both ends of the primary side first arm circuit 207 are connected to the first input-output port 60a, a buck-boost circuit is attached between the terminal 616 of the second input-output port 60c and the first input-output port 60a.

Further, the terminal 616 of the second input-output port 60c is connected to the middle point 211m of the primary side second arm circuit 211 via the primary side second winding 202b and the primary side second reactor 204b connected in series to the primary side second winding 202b. Since both ends of the primary side second arm circuit 211 are connected to the first input-output port 60a, a buck-boost circuit is attached in parallel between the terminal 616 of the second input-output port 60c and the first input-output port 60a. Note that the secondary side conversion circuit 30 is a circuit having generally the same configuration as the primary side conversion circuit 20, and therefore, two buck-boost circuits are connected in parallel to each other between the terminal 622 of the fourth input-output port 60d and the third input-output port 60b. Accordingly, the secondary side conversion circuit 30 has a buck-boost function similarly to the primary side conversion circuit 20.

Next will be described the function of power supply circuit 10 as the DC-DC converter circuit. In regard to the first input-output port 60a and the third input-output port 60b, the primary side full bridge circuit 200 is connected to the first input-output port 60a, and the secondary side full bridge circuit 300 is connected to the third input-output port 60b. The primary side coil 202 provided in a bridge portion of the primary side full bridge circuit 200 is magnetically coupled, with a coupling coefficient K, with the secondary side coil 302 provided in a bridge portion of the secondary side full bridge circuit 300, so that the transformer 400 functions as a center tap transformer with the number of turns of 1:N. Accordingly, by adjusting the phase difference $\phi$ in the switching periodic motion of the switching element between the primary side full bridge circuit 200 and the secondary side full bridge circuit 300, a power input into the first input-output port 60a can be converted and transmitted to the third input-output port 60b, or a power input into the third input-output port 60b can be converted and transmitted to the first input-output port 60a.

Figure 3:
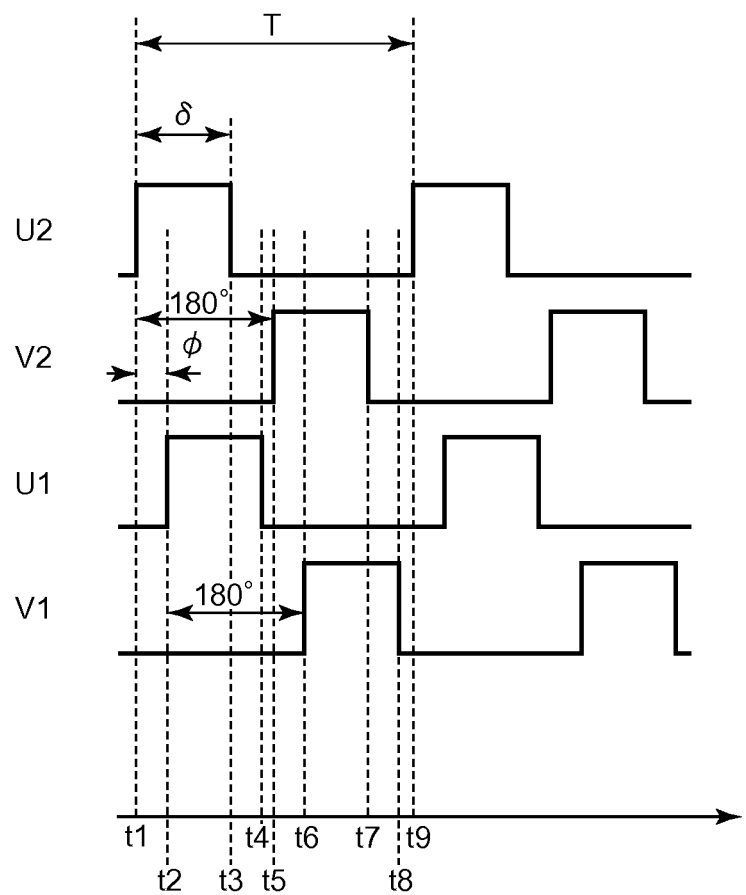
FIG. 3 is a timing chart illustrating an example of switching of a primary side circuit and a secondary side circuit.

FIG. 3 is a view illustrating a timing chart of an ON-OFF switching waveform, by control of the control unit 50, of each arm provided in the power supply circuit 10. In FIG. 3, U1 indicates an ON-OFF waveform of the primary side first upper arm U1, V1 indicates an ON-OFF waveform of the primary side second upper arm V1, U2 indicates an ON-OFF waveform of the secondary side first upper arm U2, and V2 indicates an ON-OFF waveform of the secondary side second upper arm V2. ON-OFF waveforms of the primary side first lower arm /U1, the primary side second lower arm /V1, the secondary side first lower arm /U2, and the secondary side second lower arm /V2 are reverse to the ON-OFF waveforms of the primary side first upper arm U1, the primary side second upper arm V1, the secondary side first upper arm U2, and the secondary side second upper arm V2, respectively (not shown). Note that a dead time may be provided between both the ON-OFF waveforms of the upper and lower arms, so that no through-current flows when the upper and lower arms are both turned on. Further, in FIG. 3, a high level indicates an ON state, and a low level indicates an OFF state.

Here, by changing each ON time δ of U1, V1, U2, and V2, step-up/step-down ratios of the primary side conversion circuit 20 and the secondary side conversion circuit 30 can be changed. For example, by equalizing the ON times δ of U1, V1, U2, and V2 to each other, it is possible to equalize the step-up/step-down ratio of the primary side conversion circuit 20 with the step-up/step-down ratio of the secondary side conversion circuit 30.

The ON-time-δ determination processing portion 506 equalizes the ON times δ of U1, V1, U2, and V2 with each other so that the step-up/step-down ratios of the primary side conversion circuit 20 and the secondary side conversion circuit 30 are equalized with each other (respective ON times δ=primary side ON time δ11=secondary side ON time δ12=time value β).

The step-up/step-down ratio of the primary side conversion circuit 20 is determined by a duty ratio D that is a ratio of an ON time δ that occupies a switching period T of a switching element (an arm) provided in the primary side full bridge circuit 200. Similarly, the step-up/step-down ratio of the secondary side conversion circuit 30 is determined by a duty ratio D that is a ratio of an ON time δ that occupies a switching period T of a switching element (an arm) provided in the secondary side full bridge circuit 300. The step-up/step-down ratio of the primary side conversion circuit 20 is a transformation ratio between the first input-output port 60a and the second input-output port 60c, and the step-up/step-down ratio of the secondary side conversion circuit 30 is a transformation ratio between the third input-output port 60b and the fourth input-output port 60d.

Accordingly, for example, the step-up/step-down ratio of the primary side conversion circuit 20 can be expressed such that the step-up/step-down ratio of the primary side conversion circuit 20=a voltage of the second input-output port 60c/a voltage of the first input-output port 60a=δ11/T=β/T, and the step-up/step-down ratio of the secondary side conversion circuit 30 can be expressed such that the step-up/step-down ratio of the secondary side conversion circuit 30=a voltage of the fourth input-output port 60d/a voltage of the third input-output port 60b=δ12/T=βT. That is, the step-up/step-down ratios of the primary side conversion circuit 20 and the secondary side conversion circuit 30 have the same value (=β/T).

Note that the ON time δ of FIG. 3 indicates the ON time δ11 of the primary side first upper arm U1 and the primary side second upper arm V1, and the ON time δ12 of the secondary side first upper arm U2 and the secondary side second upper arm V2. Further, the switching period T of the arm provided in the primary side full bridge circuit 200 is the same as the switching period T of the arm provided in the secondary side full bridge circuit 300.

Further, a phase difference between U1 and V1 is operated at 180 degrees (π), and a phase difference between U2 and V2 is also operated at 180 degrees (π). Further, by changing a phase difference φ between U1 and U2, a power transmission amount between the primary side conversion circuit 20 and the secondary side conversion circuit 30 can be adjusted. If the phase difference φ>0 is satisfied, a power is transmitted from the primary side conversion circuit 20 to the secondary side conversion circuit 30, and if the phase difference φ<0 is satisfied, a power is transmitted from the secondary side conversion circuit 30 to the primary side conversion circuit 20.

The phase difference φ indicates a difference (time-lag) in switching timing between power conversion circuit portions of the same phase in the primary side full bridge circuit 200 and the secondary side full bridge circuit 300. For example, the phase difference φ is a difference in switching timing between the primary side first arm circuit 207 and the secondary side first arm circuit 307, and is a difference in switching timing between the primary side second arm circuit 211 and the secondary side second arm circuit 311. Those differences are controlled so as to be equal to each other. That is, the phase difference φ between U1 and U2 and the phase difference φ between V1 and V2 are controlled to the same value.

Accordingly, in a case where an external signal that requests to cause the power supply circuit 10 to operate in the mode F as the power conversion mode, for example, the power conversion mode determination processing portion 502 determines to select the mode F. Then, the ON-time-δ determination processing portion 506 sets an ON time δ that prescribes a step-up ratio for a case where the primary side conversion circuit 20 functions as a step-up circuit configured to increase a voltage input into the second input-output port 60c and output the voltage to the first input-output port 60a. Note that the secondary side conversion circuit 30 functions as a step-down circuit configured to decrease a voltage input into the third input-output port 60b at a step-down ratio prescribed by the ON time δ set by the ON-time-δ determination processing portion 506, and to output the voltage to the fourth input-output port 60d. Further, the phase-difference-φ determination processing portion 504 sets a phase difference φ to transmit a power input into the first input-output port 60a, to the third input-output port 60b at a desired power transmission amount P.

The primary side switching processing portion 508 performs a switching control on each of the switching elements, i.e., the primary side first upper arm U1, the primary side first lower arm /U1, the primary side second upper arm V1, and the primary side second lower arm /V1, so that the primary side conversion circuit 20 functions as the step-up circuit and the primary side conversion circuit 20 functions as a part of the DC-DC converter circuit.

The secondary side switching processing portion 510 performs a switching control on each of the switching elements, i.e., the secondary side first upper arm U2, the secondary side first lower arm /U2, the secondary side second upper arm V2, and the secondary side second lower arm /V2, so that the secondary side conversion circuit 30 functions as the step-down circuit and the secondary side conversion circuit 30 functions as a part of the DC-DC converter circuit.

As described above, the primary side conversion circuit 20 and the secondary side conversion circuit 30 can function as the step-up circuit or the step-down circuit, and the power supply circuit 10 can function as a bidirectional DC-DC converter circuit. Accordingly, power conversion can be performed in all modes of the power conversion modes A to L. In other words, power conversion can be performed between two input-output ports selected from four input-output ports.

A transmitted power P (also referred to as a power transmission amount P) that is adjusted by the control unit 50 according to a phase difference ϕ, an equivalent inductance L, and the like is a power sent from one of the primary side conversion circuit 20 and the secondary side conversion circuit 30 to the other one of them via the transformer 400, and is represented by P=(N×Va×Vb)/(π×ω×L)×F(D, ϕ) . . . Formula 1.

Note that N indicates a turn ratio of the transformer 400, Va indicates an input-output voltage of the first input-output port 60a (a voltage between the primary side positive electrode bus 298 and the primary side negative electrode bus 299 of the primary side conversion circuit 20), and Vb indicates an input-output voltage of the third input-output port 60b (a voltage between the secondary side positive electrode bus 398 and the secondary side negative electrode bus 399 of the secondary side conversion circuit 30). Further, π indicates a circular constant, and ω(2=π×f=2π/T) indicates an angular frequency of switching of the primary side conversion circuit 20 and the secondary side conversion circuit 30. Further, f indicates a switching frequency of the primary side conversion circuit 20 and the secondary side conversion circuit 30, T indicates a switching period of the primary side conversion circuit 20 and the secondary side conversion circuit 30, and L indicates an equivalent inductance related to power transmission between the magnetic coupling reactors 204, 304 and the transformer 400. F(D,ϕ) is a function with the duty ratio D and the phase difference ϕ being taken as variables, and is a variable that increases monotonically without depending on the duty ratio D, as the phase difference ϕ increases. The duty ratio D and the phase difference ϕ are control parameters that are designed to change within a range sandwiched between predetermined upper and lower limits.

The equivalent inductance L can be defined on a simple equivalent circuit of the transformer 400 to which the primary side magnetic coupling reactor 204 and/or the secondary side magnetic coupling reactor 304 are connected. The equivalent inductance L is a synthetic inductance obtained by combining a leakage inductance of the primary side magnetic coupling reactor 204 and/or a leakage inductance of the secondary side magnetic coupling reactor, with a leakage inductance of the transformer 400.

For example, an equivalent inductance L (a secondary side reduced value $L_{EQ2}$) measured in the secondary side conversion circuit 30 is represented by $L_{EQ2}=2L_1(1-k_1)N^2+2L_2(1-k_2)+L_{T2}(1-k_T^2)$ . . . Formula 2.

$L_1$ indicates a self-inductance of the primary side magnetic coupling reactor 204, $k_1$ indicates a coupling coefficient of the primary side magnetic coupling reactor 204, N indicates a turn ratio of the transformer 400, $L_2$ indicates a self-inductance of the secondary side magnetic coupling reactor 304, $k_2$ indicates a coupling coefficient of the secondary side magnetic coupling reactor 304, $L_{T2}$ indicates a secondary side excitation inductance of the transformer 400, and $k_T$ is a coupling coefficient of the transformer 400. Note that, in a case where the second input-output port 60c or the fourth input-output port 60d is not used, Formula 2 may not have the leakage inductance represented by the first term or the second term therein.

Further, the control unit 50 adjusts the transmitted power P by changing the phase difference ϕ so that a port voltage Vp in at least one predetermined port out of the primary side ports and the secondary side ports is converged to a target port voltage Vo. Accordingly, even if a consumed current of a load connected to the predetermined port increases, the control unit 50 adjusts the transmitted power P by changing the phase difference ϕ, thereby making it possible to prevent the port voltage Vp from dropping relative to the target port voltage Vo.

For example, the control unit 50 adjusts the transmitted power P by adjusting the phase difference ϕ so that a port voltage Vp of one of the primary side ports and the secondary side ports which is a destination of the transmitted power P is converged to the target port voltage Vo. Accordingly, even if a consumed current of a load connected to the port as the destination of the transmitted power P increases, the control unit 50 adjusts the transmitted power P to an increasing direction by changing the phase difference ϕ to increase, thereby making it possible to prevent the port voltage Vp from dropping relative to the target port voltage Vo.

Figure 4:
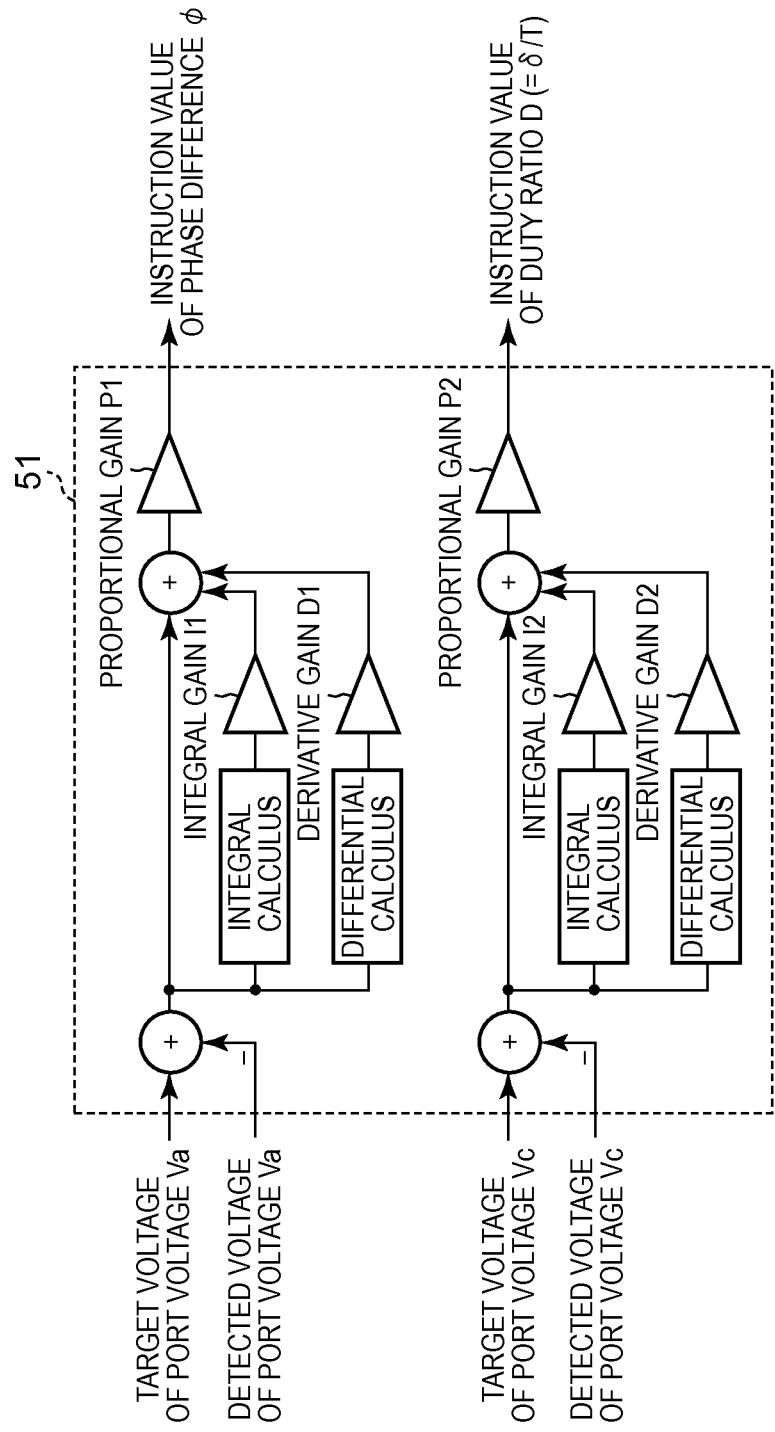
FIG. 4 is a block diagram illustrating an exemplary configuration of the control unit.

FIG. 4 is a block diagram illustrating an exemplary configuration of the control unit 50 that calculates a PID calculation value. The control unit 50 includes a PID control portion 51 and the like. The PID calculation value is an instruction value ϕo of the phase difference ϕ, or an instruction value Do of the duty ratio D, for example.

The PID control portion 51 includes a phase-difference instruction value generation portion configured to perform a PID control so as to generate, at every switching period T, the instruction value ϕo of the phase difference ϕ to converge a port voltage of at least one of the primary side ports and the secondary side ports to a target voltage. For example, the phase-difference instruction value generation portion of the PID control portion 51 performs a PID control based on a deviation between the target voltage of the port voltage Va and that detected voltage of the port voltage Va which is obtained by the sensor portion 70, so as to generate, at every switching period T, the instruction value ϕo to converge the deviation to zero.

The control unit 50 performs a switching control of the primary side conversion circuit 20 and the secondary side conversion circuit 30 according to the instruction value ϕo generated by the PID control portion 51, so as to adjust the transmitted power P defined by Formula 1 to converge the port voltage to the target voltage.

Further, the PID control portion 51 includes a duty-ratio instruction value generation portion configured to perform a PID control so as to generate, at every switching period T, the instruction value Do of the duty ratio D to converge a port voltage of at least one of the primary side ports and the secondary side ports to a target voltage. For example, the duty-ratio instruction value generation portion of the PID control portion 51 performs a PID control based on a deviation between the target voltage of the port voltage Vc and that detected voltage of the port voltage Vc which is obtained by the sensor portion 70, so as to generate, at every switching period T, the instruction value Do to converge the deviation to zero.

Note that the PID control portion 51 may include an ON-time instruction value generation portion configured to generate an instruction value δo of the ON time δ instead of the instruction value Do of the duty ratio D.

The PID control portion 51 adjusts the instruction value ϕo of the phase difference ϕ based on an integral gain I1, a derivative gain D1, and a proportional gain P1, and adjusts the instruction value Do of the duty ratio D based on an integral gain I2, a derivative gain D2, and a proportional gain P2.

Note that the port voltage Va, the port voltage Vc, and the duty ratio D have such a relationship of Port Voltage Va×Duty Ratio D=Port Voltage Vc. Accordingly, in a case where a given port voltage Va (e.g., 10 V) is decreased to increase the port voltage Vc (e.g., from 1 V to 5 V), the duty ratio D should be increased (e.g., from 10% to 50%). On the other hand, in a case where a given port voltage Vc (e.g., 5 V) is increased to increase the port voltage Va (e.g., from 10 V to 50 V), the duty ratio D should be decreased (e.g., from 50% to 10%). That is, the PID control portion 51 changes a controlled target (the first input-output port 60a or the second input-output port 60c), so as to change a control direction (a direction to increase or decrease the duty ratio D) of the duty ratio D in a reverse manner between a case of a step-up operation and a case of a step-down operation.

<Power Supply to Auxiliary Device>

Figure 5:
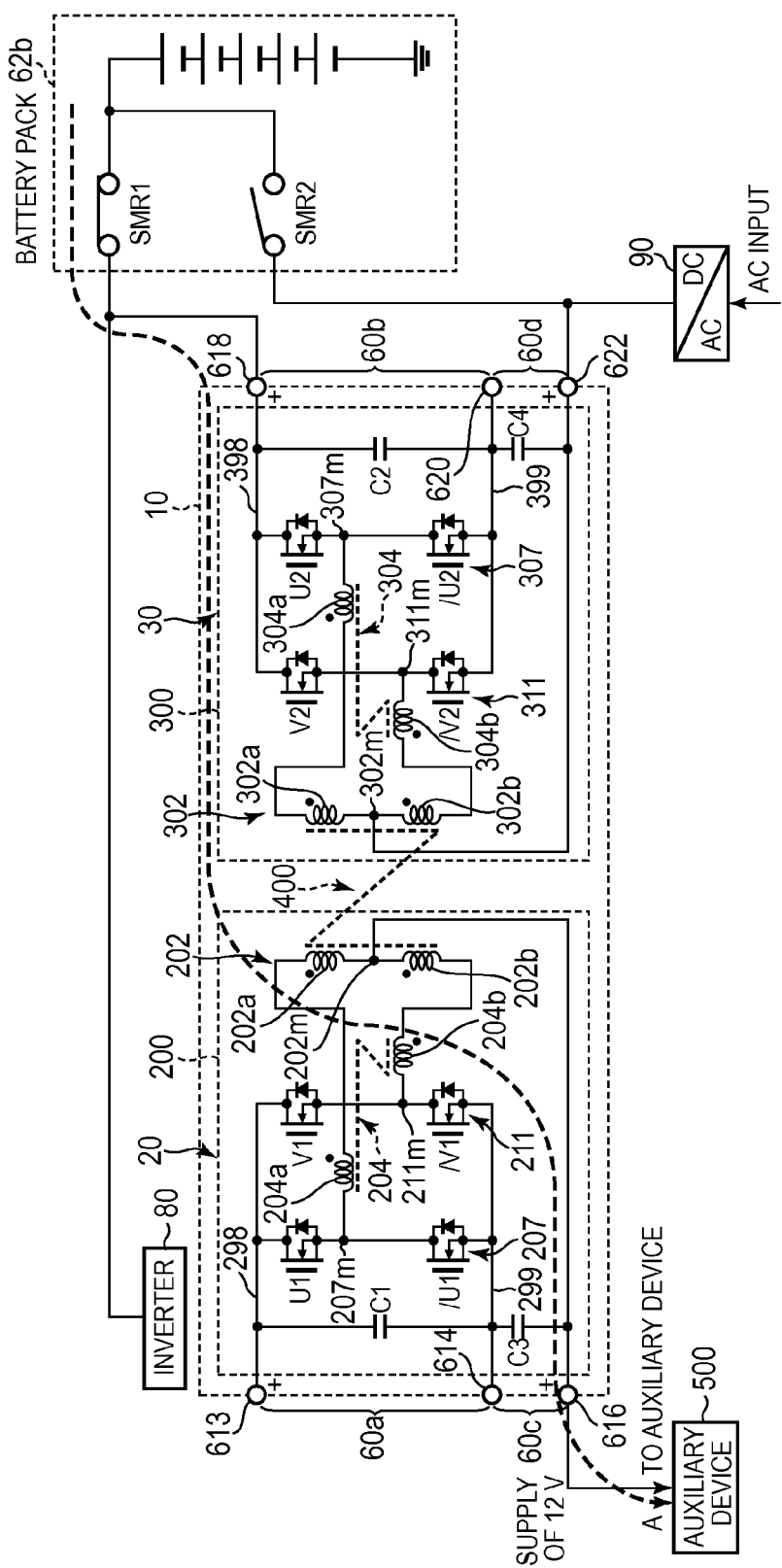
FIG. 5 is a block diagram illustrating an exemplary configuration of the power supply device according to the embodiment of the power conversion apparatus.
Figure 6:
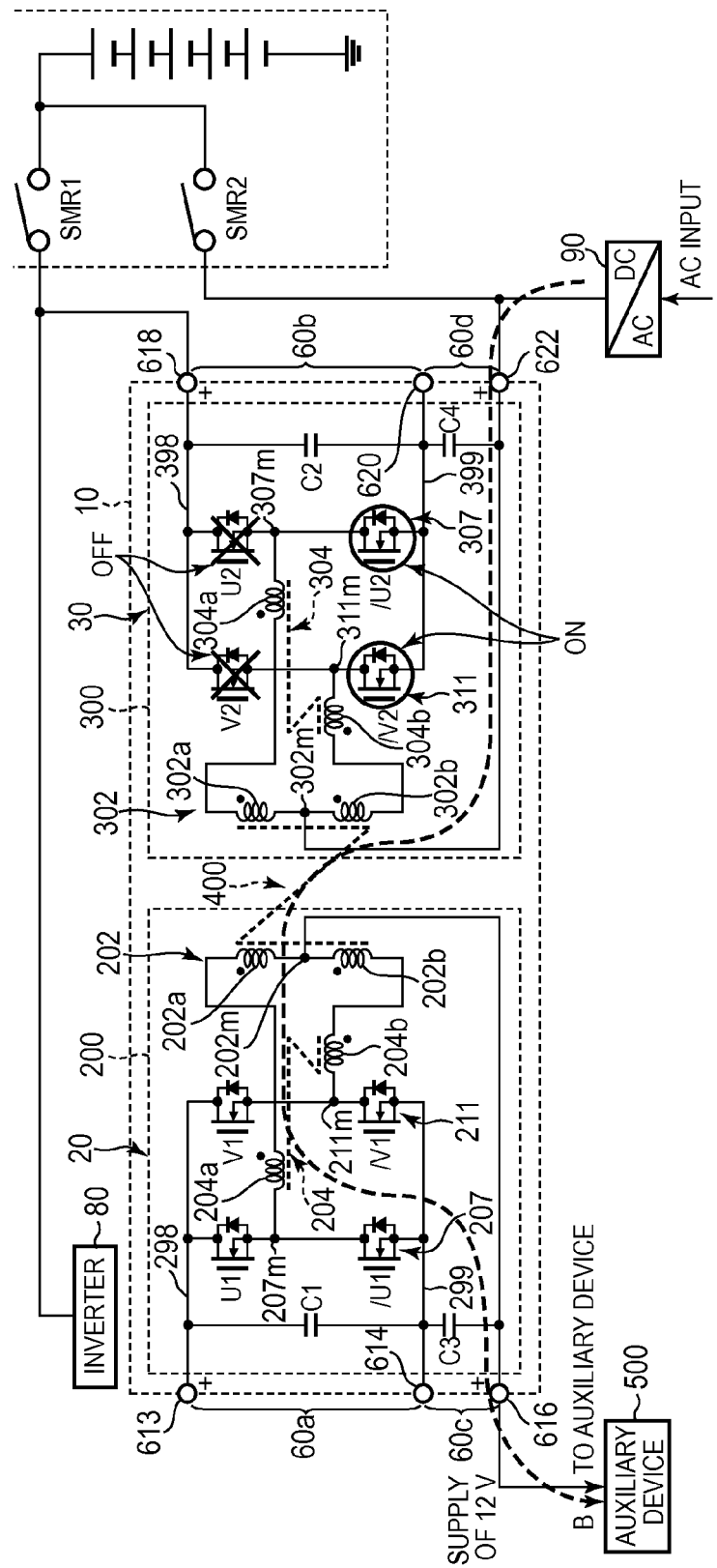
FIG. 6 is a block diagram illustrating an exemplary configuration of the power supply device according to the embodiment of the power conversion apparatus.
Figure 7:
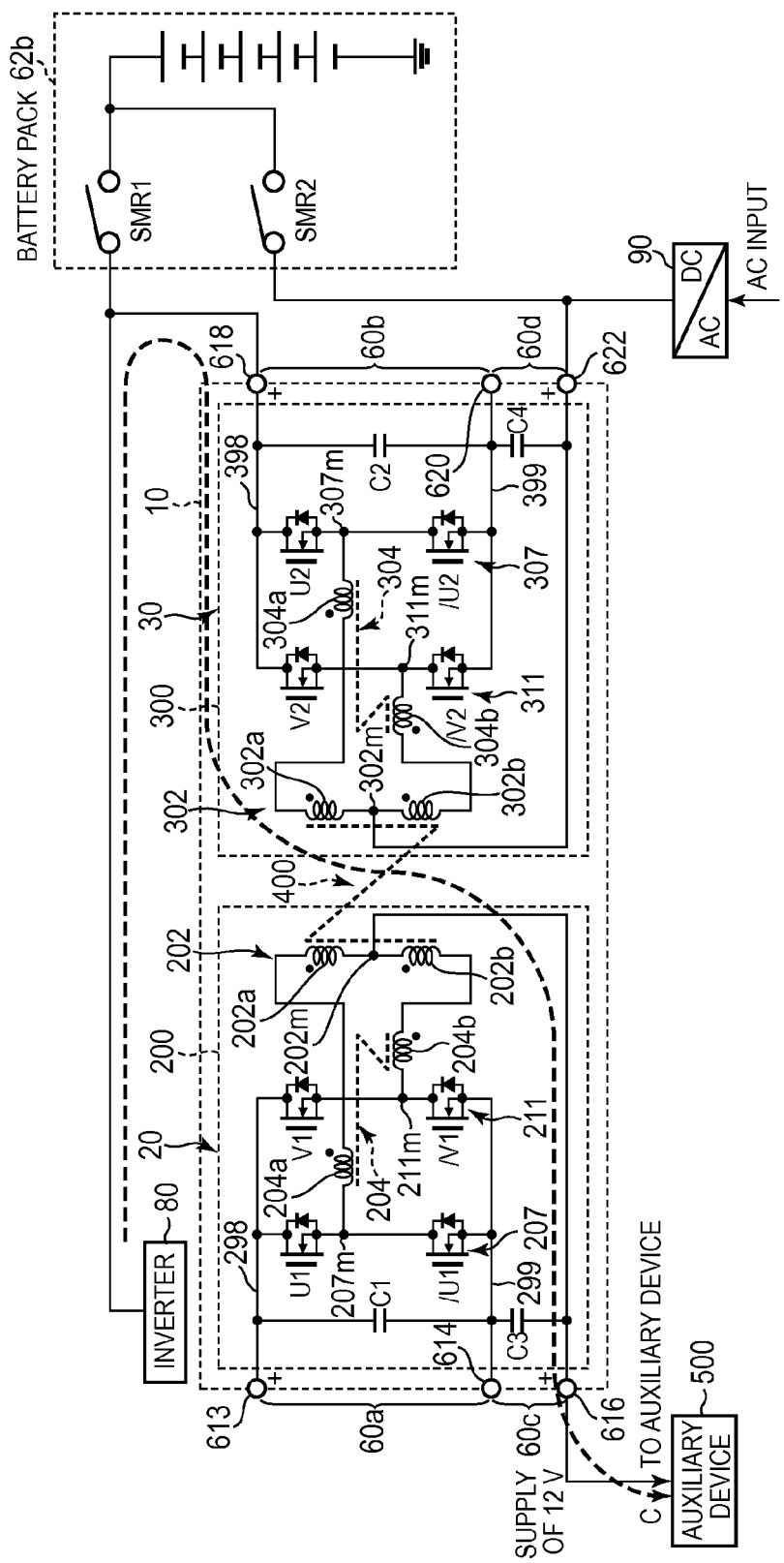
FIG. 7 is a block diagram illustrating an exemplary configuration of the power supply device according to the embodiment of the power conversion apparatus.

FIGS. 5 to 7 are views each illustrating an example of power supply to an auxiliary device 500. FIG. 5 is a view illustrating a case where a power is supplied from the battery pack 62b to the auxiliary device 500. FIG. 6 is a view illustrating a case where a power is supplied from the charger 90 to the auxiliary device 500. FIG. 7 is a view illustrating a case where a power is supplied from the inverter 80 to the auxiliary device 500.

The battery pack (the secondary side high-voltage power supply) 62b is a high-voltage battery configured to accumulate energy to drive a vehicle, and includes SMRs (system main relays), that is, a SMR1 provided on an inverter-80 side, and a SMR2 provided on a charger-90 side. Connection/non-connection of the battery pack 62b with the inverter 80 and the power supply circuit 10 is controlled by ON-OFF of the SMR1. Further, connection/non-connection of the battery pack 62b with the charger 90 and the power supply circuit 10 is controlled by ON-OFF of the SMR2.

Note that the auxiliary device 500 indicates various devices, apparatuses, and the like provided in a vehicle and configured to receive a power from the battery pack 62b, the charger 90, the inverter 80, and the like. Examples thereof include an electronic control unit, a lamp, a light wiper, and the like.

[Case where Power is Supplied from Battery Pack 62b to Auxiliary Device 500]

As illustrated in FIG. 5, while the vehicle is running, a power is transmitted from the battery pack 62b to the auxiliary device 500 via the power supply circuit 10 (see an arrow A in the figure).

During the running of the vehicle, the SMR1 is turned on and the SMR2 is turned off. Accordingly, the battery pack 62b is connected to the inverter 80, and the battery pack 62b is unconnected to the charger 90.

As for the ON-OFF timing of each arm, the timing chart of the switching waveforms illustrated in FIG. 3 can be referred to. The ON-OFF waveforms of the primary side first upper arm U1 and the primary side second upper arm V1 are the switching waveforms illustrated in FIG. 3. Further, the ON-OFF waveforms of the primary side first lower arm /U1 and the primary side second lower arm /V1 are waveforms (not shown) reverse to the ON-OFF waveforms of the primary side first upper arm U1 and the primary side second upper arm V1 in the switching waveforms in FIG. 3.

Further, the ON-OFF waveforms of the secondary side first upper arm U2 and the secondary side second upper arm V2 are switching waveforms illustrated in FIG. 3. Further, the ON-OFF waveforms of the secondary side first lower arm /U2 and the secondary side second lower arm /V2 are waveforms (not shown) reverse to the ON-OFF waveforms of the secondary side first upper arm U2 and the secondary side second upper arm V2 in the switching waveforms in FIG. 3.

When the control unit 50 controls the ON-OFF of the SMR1 and the SMR2 included in the battery pack 62b, and the ON-OFF of each arm appropriately, it is possible to supply a power from the battery pack 62b to the auxiliary device 500 during the running of the vehicle.

[Case where Power is Supplied from Charger 90 to Auxiliary Device 500]

As illustrated in FIG. 6, while the vehicle is parked, a power is transmitted from the charger 90 to the auxiliary device 500 via the power supply circuit 10 (see an arrow B in the figure).

During the parking of the vehicle, the SMR1 and the SMR2 are turned off. Accordingly, the battery pack 62b is unconnected to the inverter 80 and the charger 90.

As for the ON-OFF timing of each arm, the timing chart of the switching waveforms illustrated in FIG. 3 can be referred to. The ON-OFF waveforms of the primary side first upper arm U1 and the primary side second upper arm V1 are the switching waveforms illustrated in FIG. 3. Further, the ON-OFF waveforms of the primary side first lower arm /U1 and the primary side second lower arm /V1 are waveforms (not shown) reverse to the ON-OFF waveforms of the primary side first upper arm U1 and the primary side second upper arm V1 in the switching waveforms illustrated in FIG. 3.

Further, the ON-OFF waveforms of the secondary side first upper arm U2 and the secondary side second upper arm V2 are waveforms (not shown) obtained by fixing, to an OFF state, the ON-OFF waveforms of the secondary side first upper arm U2 and the secondary side second upper arm V2 in the switching waveforms illustrated in FIG. 3. Further, the ON-OFF waveforms of the secondary side first lower arm /U2 and the secondary side second lower arm /V2 are waveforms (not shown) obtained by fixing, to an ON state, the ON-OFF waveforms of the secondary side first lower arm /U2 and the secondary side second lower arm /V2 in the switching waveforms illustrated in FIG. 3.

When the control unit 50 fixes the secondary side first upper arm U2 and the secondary side second upper arm V2 to the OFF state, and fixes the secondary side first lower arm /U2 and the secondary side second lower arm /V2 to the ON state, the charger 90 is insulated from the inverter 80. Hereby, it is possible to supply a power from the charger 90 to the auxiliary device 500 during the parking of the vehicle.

[Case where Power is Supplied from Inverter 80 to Auxiliary Device 500]

As illustrated in FIG. 7, while the battery pack 62b breaks down (the vehicle is running), a power is transmitted from the inverter 80 to the auxiliary device 500 via the power supply circuit 10 (see an arrow C in the figure).

Due to the breakdown of the battery pack 62b, the SMR1 and the SMR2 are turned off. Accordingly, the battery pack 62b is unconnected to the inverter 80 and the charger 90.

As for the ON-OFF timing of each arm, the timing chart of the switching waveforms illustrated in FIG. 3 can be referred to. The ON-OFF waveforms of the primary side first upper arm U1 and the primary side second upper arm V1 are switching waveforms illustrated in FIG. 3. Further, the ON-OFF waveforms of the primary side first lower arm /U1 and the primary side second lower arm /V1 are waveforms (not shown) reverse to the ON-OFF waveforms of the primary side first upper arm U1 and the primary side second upper arm V1 in the switching waveforms illustrated in FIG. 3.

Further, the ON-OFF waveforms of the secondary side first upper arm U2 and the secondary side second upper arm V2 are switching waveforms illustrated in FIG. 3. Further, the ON-OFF waveforms of the secondary side first lower arm /U2 and the secondary side second lower arm /V2 are waveforms (not shown) reverse to the ON-OFF waveforms of the secondary side first upper arm U2 and the secondary side second upper arm V2 in the switching waveforms illustrated in FIG. 3.

When the control unit 50 controls the ON-OFF of each arm appropriately, it is possible to supply a power from the inverter 80 to the auxiliary device 500 during the breakdown of the battery pack 62b. Accordingly, even in a case where power supply from the battery pack 62b to the auxiliary device 500 is cut off during the running of the vehicle, it is possible to sufficiently work a failsafe function by use of the inverter 80 (a double power supply system).

As illustrated in FIGS. 5 to 7, the power supply device 101 can perform power supply (e.g., a power of 12 V) from the battery pack 62b to the auxiliary device 500 via the power supply circuit 10 during the running of the vehicle, the power supply device 101 can perform power supply (e.g., a power of 12 V) from the charger 90 to the auxiliary device 500 via the power supply circuit 10 during the parking of the vehicle, and the power supply device 101 can perform power supply (e.g., a power of 12 V) from the inverter 80 to the auxiliary device 500 via the power supply circuit 10 during the breakdown of the battery pack 62b.

[Exemplary Configuration of Power Supply Device of Related Art]

Figure 8:
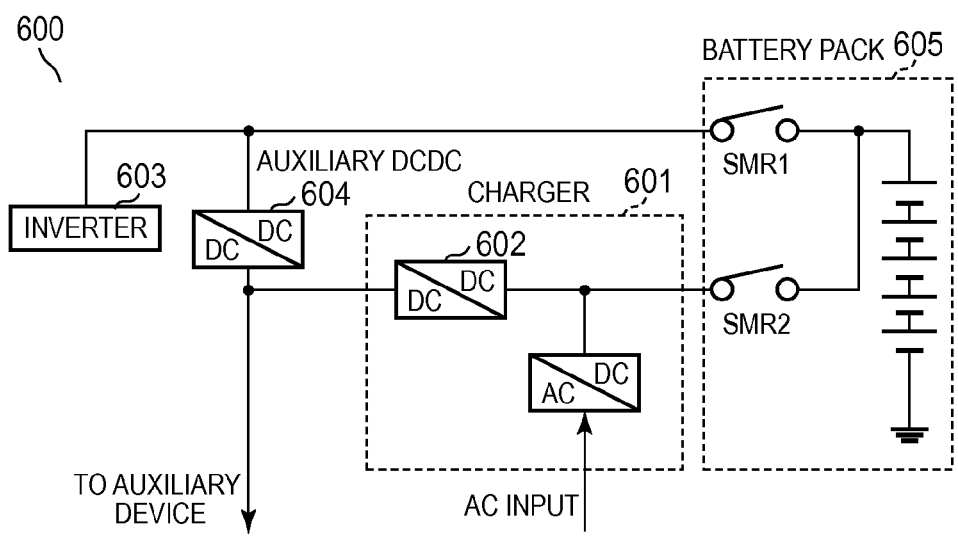
FIG. 8 is a block diagram illustrating an exemplary configuration of a power supply device of a related art.

FIG. 8 illustrates an exemplary configuration of a power supply device of a related art.

A power supply device 600 of the related art includes a charger 601, a DCDC converter 602 (around 0.2 kW) provided in the charger 601, an inverter 603, a DCDC converter (an auxiliary DCDC converter) 604 (around 1.5 kW) connected to the inverter 603, and a battery pack 605. Since two DCDC converters are provided, the configuration of the power supply device 600 of the related art takes many costs. Accordingly, the following discusses configurations of FIGS. 9A, 9B in which the number of DCDC converters is reduced, for example.

Figure 9A:
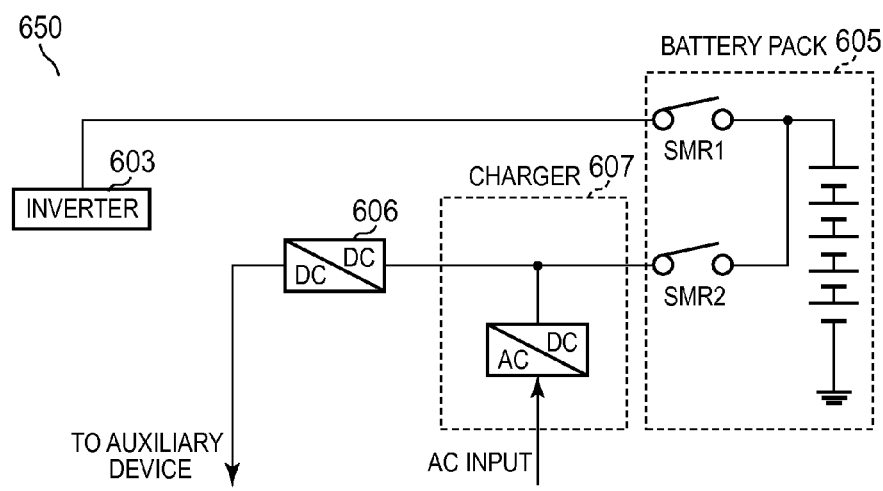
FIG. 9A is a block diagram illustrating an exemplary configuration of a power supply device of a related art.

For example, as illustrated in FIG. 9A, a DCDC converter 606 is provided outside a charger 607, so that the auxiliary DCDC converter 604 connected to the inverter 603 is removed. This configuration is referred to as a configuration 650.

In the configuration illustrated in FIG. 9A, when the battery pack 605 breaks down, a path between the inverter 603 and the DCDC converter 606 is completely cut off. Accordingly, it is difficult to supply a power from the inverter 603 to the auxiliary device. Further, when a power is supplied from the battery pack 605 to the auxiliary device, an SMR on a charger-607 side should be turned on, and when a power is supplied from the inverter 603 to the auxiliary device, the SMR on the charger-607 side and an SMR on an inverter-603 side should be turned on. Because of this, the number of switching times of the SMRs increases, so that the battery pack 605 is easy to deteriorate. Note that the number of switching times of the SMRs has an upper limit, and it is set to the same as the number of times of power activation (around 100,000 times) in general.

Figure 9B:
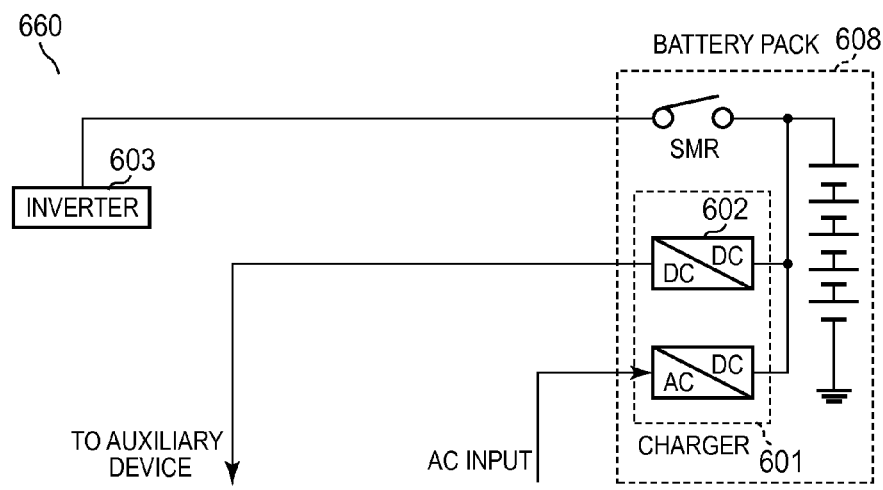
FIG. 9B is a block diagram illustrating an exemplary configuration of a power supply device of another related art.
Figure 6:
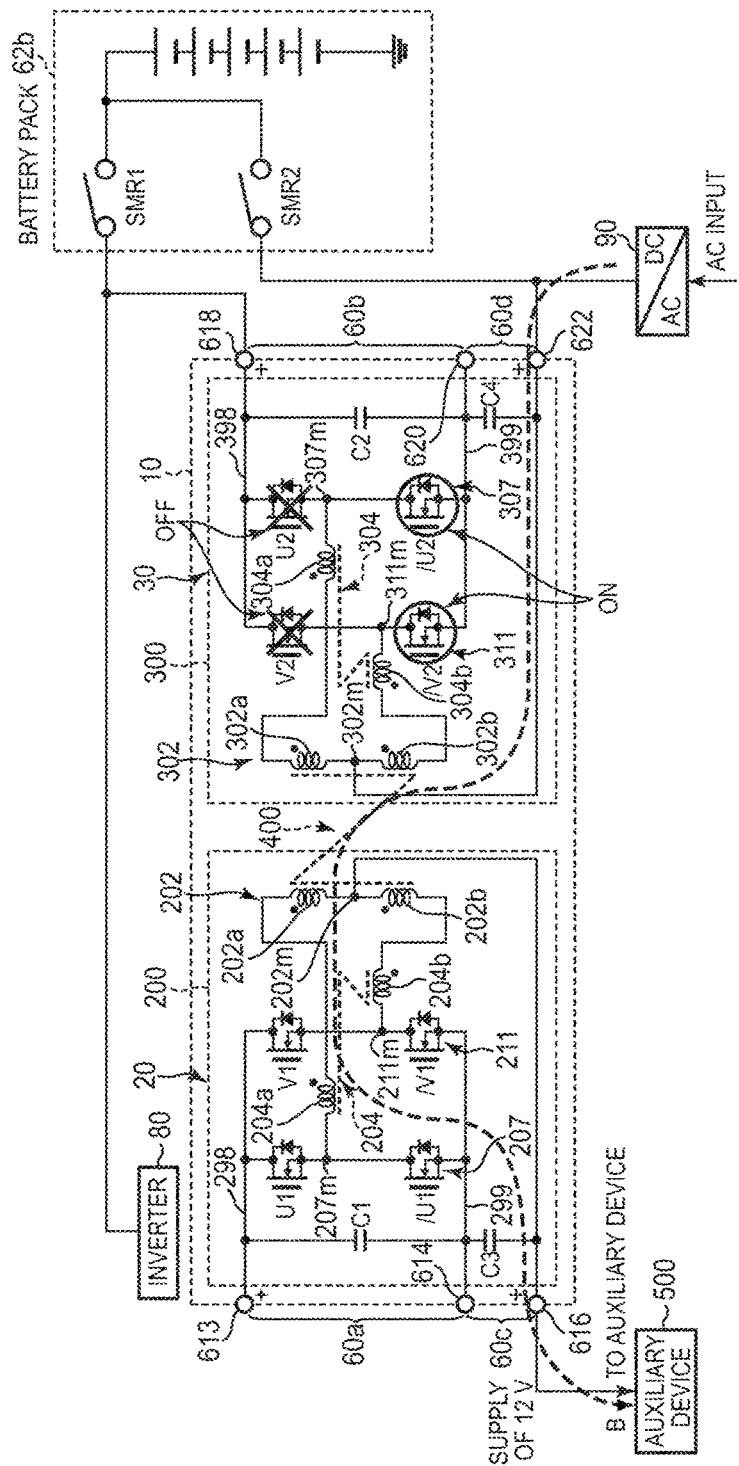

Further, for example, as illustrated in FIG. 9B, a charger 601 is provided inside a battery pack 608, so that the auxiliary DCDC converter 604 connected to the inverter 603 is removed. This configuration is referred to as a configuration 660.

Even in the configuration illustrated in FIG. 9B, when the battery pack 608 breaks down, a path between the inverter 603 and the DCDC converter 602 is completely cut off. Accordingly, it is difficult to supply a power from the inverter 603 to the auxiliary device.

That is, in the configuration 650 illustrated in FIG. 9A and the configuration 660 illustrated in FIG. 9B, the number of DCDC converters can be reduced in comparison with the configuration of the related art. However, a function similarly to that of the configuration of the related art cannot be realized.

According to the configuration of the power conversion apparatus according to the present embodiment, the function similarly to that of the configuration of the related art can be realized with a low cost (without using a plurality of DCDC converters).

The power conversion apparatus has been described above according to the embodiment, but the present invention is not limited to the embodiment. Various modifications and alterations such as a combination or substitution with a part of or all of other embodiments can be made within the scope of the present invention.

For example, in the above embodiment, a MOSFET, which is a semiconductor element that performs an ON-OFF operation, is exemplified as an example of the switching element. However, the switching element may be a voltage-controlled power element with an insulated gate such as an IGBT or a MOSFET, or a bipolar transistor.

Further, a power supply may be connected to the first input-output port 60a and the fourth input-output port 60d.

Further, the secondary side is defined as the primary side, and the primary side may be defined as the secondary side.

Further, the present invention is applicable to a power conversion apparatus which has at least three or more input-output ports and which can convert a power between any two input-output ports selected from among the at least three or more input-output ports. For example, the present invention is applicable to a power supply device having a configuration in which any one of the four input-output ports exemplified in FIG. 1 is not provided.

What is claimed is:

1. A power conversion apparatus supplying a power to an auxiliary device provided in a vehicle, the power conversion apparatus comprising:
   a primary side circuit including a primary side port;
   a secondary side circuit including a plurality of secondary side ports and magnetically coupled with the primary side circuit via a transformer;
   a control unit configured to control a transmitted power that is transmitted between the primary side circuit and the secondary side circuit by changing a phase difference between a switching of the primary side circuit and a switching of the secondary side circuit;
   an inverter connected to a first secondary side port of the plurality of secondary side ports and supplying the power to the auxiliary device via the primary side port; and
   a charger connected to a second secondary side port of the plurality of secondary side ports and supplying the power to the auxiliary device via the primary side port.

2. The power conversion apparatus according to claim 1, wherein
   when the power is supplied from the charger to the auxiliary device, the control unit insulates the charger from the inverter.

3. The power conversion apparatus according to claim 1, wherein the secondary side circuit includes a secondary side first upper arm, a secondary side second upper arm, a secondary side first lower arm, and a secondary side second lower arm; and when the power is supplied from the charger to the auxiliary device, the control unit fixes the secondary side first upper arm and the secondary side second upper arm to an OFF state, and fixes the secondary side first lower arm and the secondary side second lower arm to an ON state.

4. The power conversion apparatus according to claim 1, wherein during parking of the vehicle, the power is supplied from the charger to the auxiliary device.

5. The power conversion apparatus according to claim 1, further comprising:

a secondary side high-voltage power supply connected to the first secondary side port and the second secondary side port and supplying the power to the auxiliary device via the primary side port, wherein during running of the vehicle, the power is supplied from the secondary side high-voltage power supply to the auxiliary device.

6. The power conversion apparatus according to claim 5, wherein during breakdown of the secondary side high-voltage power supply, the power is supplied from the inverter to the auxiliary device.

* * * * *

UNITED STATES PATENT AND TRADEMARK OFFICE
CERTIFICATE OF CORRECTION

PATENT NO. : 9,744,856 B2  
APPLICATION NO. : 14/677362  
DATED : August 29, 2017  
INVENTOR(S) : Kenichiro Nagashita It is certified that error appears in the above-identified patent and that said Letters Patent is hereby corrected as shown below:

In the Drawings

Sheet 6, replace FIG. 6 with the attached drawing sheet.

Signed and Sealed this  
Nineteenth Day of December, 2017

Joseph Matal  
*Performing the Functions and Duties of the*  
*Under Secretary of Commerce for Intellectual Property and*  
*Director of the United States Patent and Trademark Office*